No. 841,374. PATENTED JAN. 15, 1907.
W. F. COOK.
SELF CLEANING DITCHING SHOVEL.
APPLICATION FILED JULY 6, 1906.
3 SHEETS—SHEET 1.
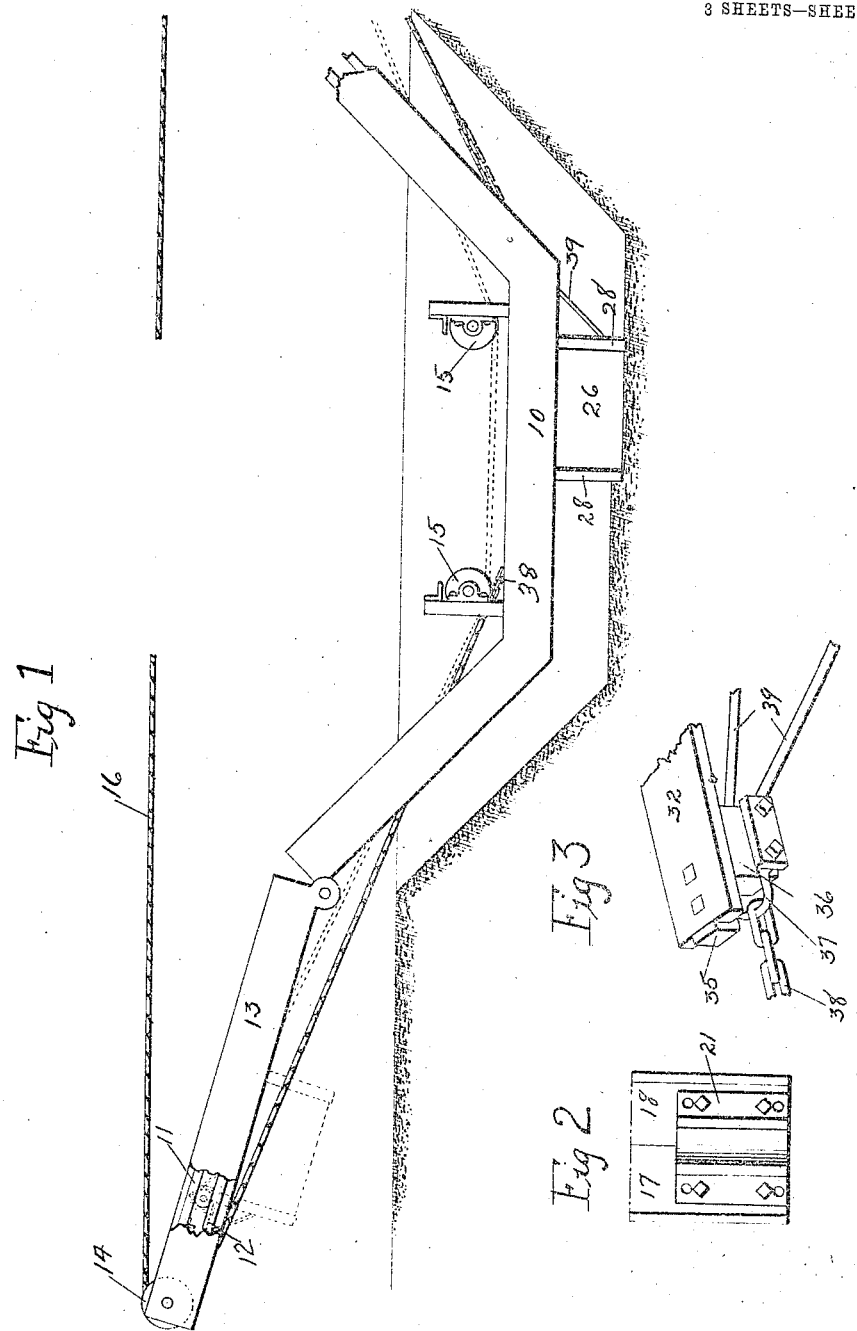
Witnesses
A. G. Hague
K. K. Keffer.
Inventor
W. F. Cook.
by Orwig & Lane attys.

No. 841,374. PATENTED JAN. 15, 1907.
W. F. COOK.
SELF CLEANING DITCHING SHOVEL.
APPLICATION FILED JULY 6, 1906.
3 SHEETS—SHEET 2.
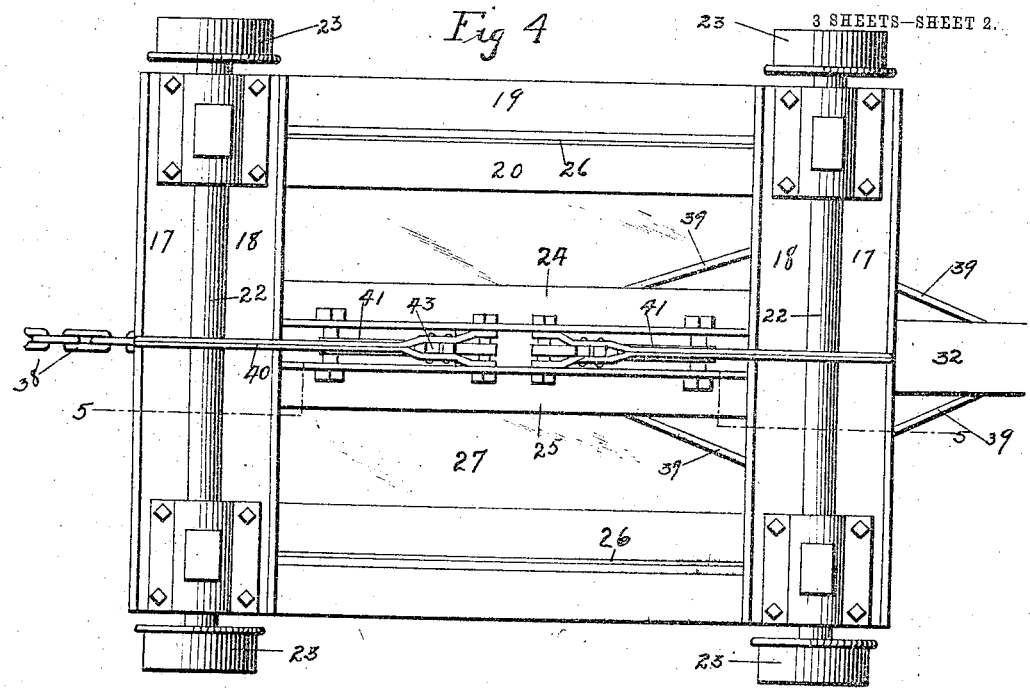
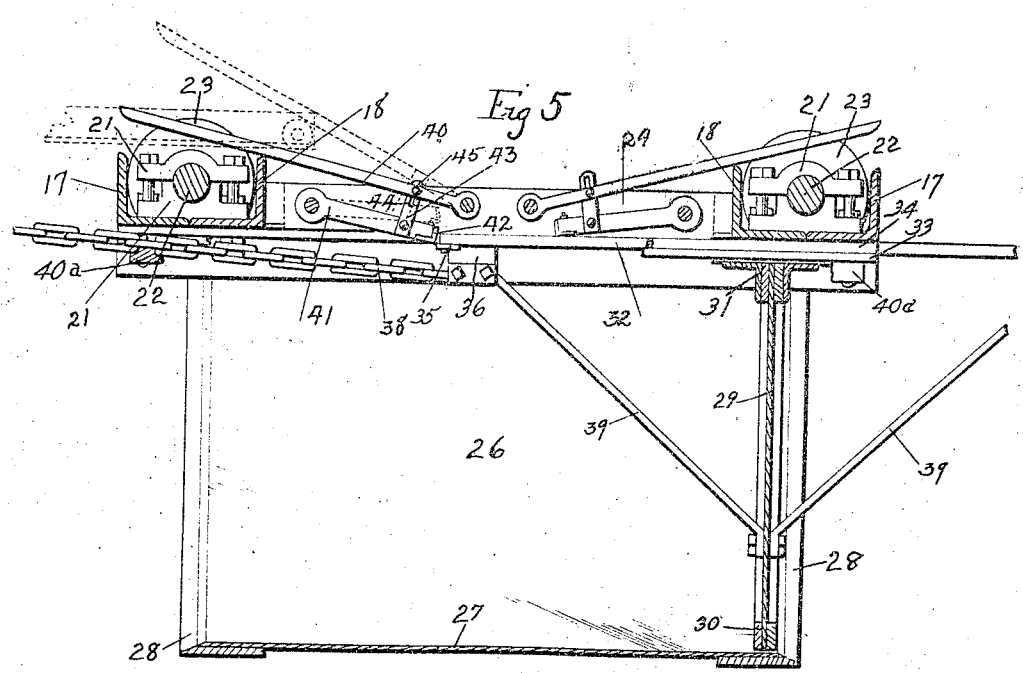
Witnesses.
A. G. Hague
K. K. Heffer.
Inventor.
W. F. Cook.
by Orwig & Lane Attys.

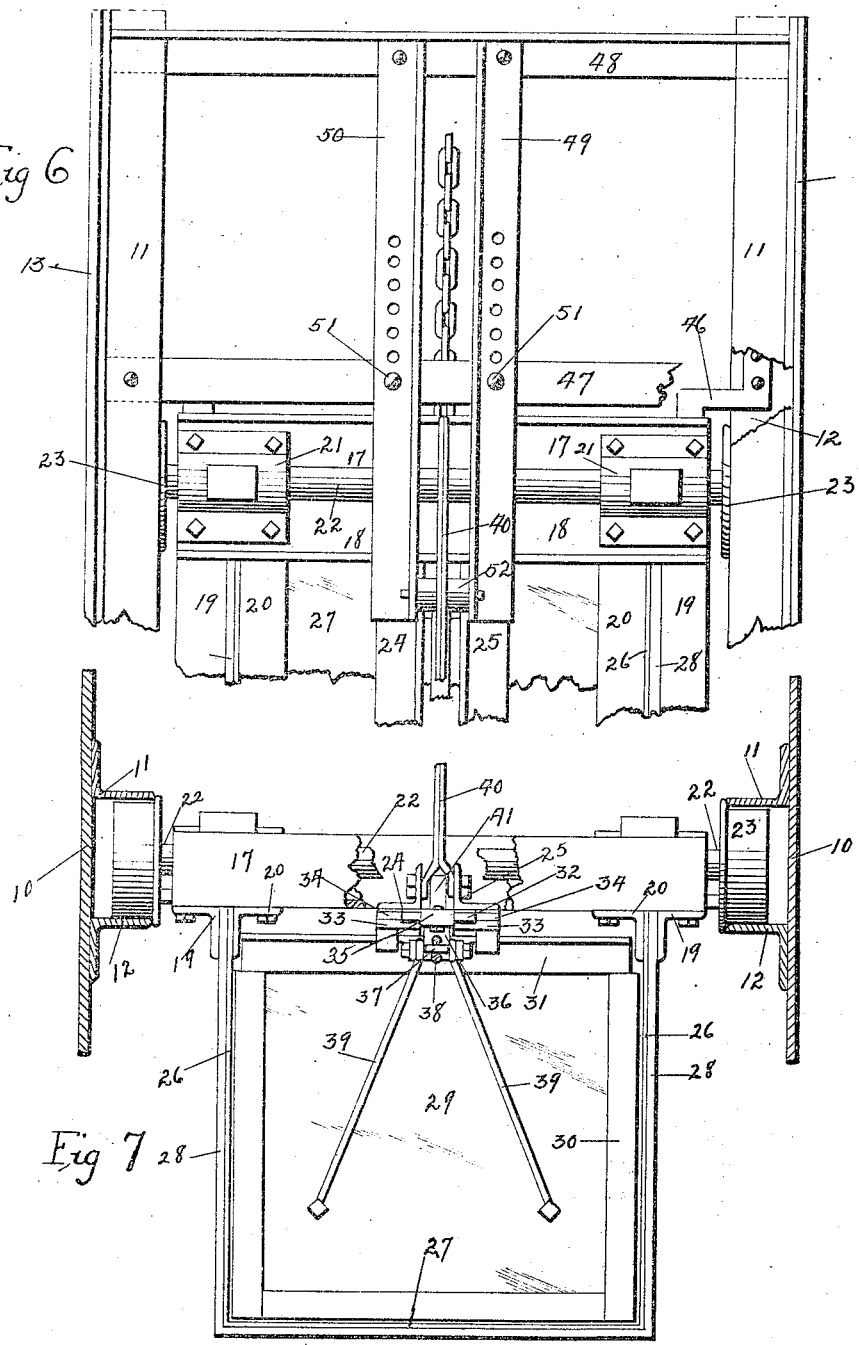

UNITED STATES PATENT OFFICE.

WILLIAM F. COOK, OF DES MOINES, IOWA.

SELF-CLEANING DITCHING-SHOVEL.

No. 841,374.

Specification of Letters Patent.

Patented Jan. 15, 1907.

Application filed July 6, 1906. Serial No. 325,398.

*To all whom it may concern:*

Be it known that I, WILLIAM F. COOK, a citizen of the United States, residing at Des Moines, in the county of Polk and State of Iowa, have invented a certain new and useful Self-Cleaning Ditching-Shovel, of which the following is a specification.

My improved shovel is especially designed for use in connection with that class of ditching-machines in which the shovel is moved transversely across the bottom of the ditch and then removed to a point at the side of a ditch, where its load is discharged.

My object is to provide a shovel of this class having a back capable of sliding movement within the shovel from one end to the other to form a back when the shovel is moved in either direction and, further, to provide means for stopping the body of the shovel when it has reached a discharge-point and then to advance the back to thereby discharge the load and clean the shovel and to stand in position for forming a back for the shovel when the shovel is moved in the opposite direction.

A further object is to provide simple, durable, and inexpensive means for automatically locking the back when it has reached either limit of its movement and for releasing the back and moving it toward the other end of the shovel when the shovel has reached a discharge-point.

My invention consists in the construction, arrangement, and combination of the various parts of the shovel and the coacting parts whereby the objects contemplated are attained, as hereinafter more fully set forth, pointed out in my claims, and illustrated in the accompanying drawings, in which—

Figure 1 shows an end elevation of a portion of a ditching-machine in a ditch with my improved shovel and a part of the shovel-moving devices in position thereon. The dotted lines show the position of the shovel when it has reached a discharge-point. Fig. 2 shows a detail plan view of a part of one of the bearing-boxes for supporting one of the axles of the shovel. Fig. 3 shows a detail perspective view illustrating a part of the shovel-back supporting and guiding plate and the means for attaching the draft-chain thereto. Fig. 4 shows a top or plan view of the shovel. Fig. 5 shows a vertical sectional view on the line 5 5 of Fig. 4. Fig. 6 shows a top or plan view of a part of the shovel and a part of the shovel-supporting frame at one of the discharge-points of said frame; and Fig. 7 shows an end view of the shovel with the shovel-supporting tracks in section, a portion of the supporting cross-pieces of the shovel-frame being broken away to show certain details of construction.

Referring to the accompanying drawings, the part of the ditching-machine shown consists only of the members that support the shovel and comprise a central portion composed of two side plates 10, with angle-bars 11 and 12 projecting inwardly from their inner faces to form tracks. At one end of the side plates 10 is a hinged extension 13, which may be raised or lowered to give proper elevation for discharging the load at the side of a ditch. At the outer end of the extension 13 is a direction-pulley 14, and near the center of the frame 10 are two direction-pulleys 15. A rope or cable 16 is passed around the pulley 14 and under the pulleys 15, its ends being connected with the shovel, as will hereinafter appear. This rope or cable is designed to move the shovel alternately from one side of the ditch to the other, and the ditching-machine may be provided with the usual means for operating said cable.

The shovel comprises a top frame consisting of two end cross-pieces, each made of two angle-bars 17 and 18. These are connected by means of two angle-bars 19 and 20 at each side, thus forming a rigid rectangular frame. In each of the end cross-pieces I have mounted two bearing-boxes 21 to receive the axles 22, on the ends of which are the flanged supporting-wheels 23, designed to travel between the angle-bars 11 and 12, which form the tracks on the frame of the ditching-machine. The cross-pieces of the shovel-frame are also connected by two central longitudinal angle-bars 24 and 25, slightly spaced apart, to admit trip devices between them, as will hereinafter appear. The sides and bottom of the shovel are preferably formed of a plate metal 26 with their top edges inserted between the angle-bars 19 and 20 and firmly secured thereto, said sides being extended straight downwardly and the bottom piece 27 being arranged at right angles to the sides at both ends. This side and bottom plate is reinforced and strengthened by means of a cutting-bar 28, which has its ends secured between the angle-bars 19 and 20 and its sides and bottom firmly connected to the adjacent end of the sides and bottom of the shovel and provided with a sharpened edge extending beyond the plate which forms the sides and bottom. These cutting-bars 28 are arranged on the outer surface of the sides and bottom, so that the interiors of the sides and bottom are smooth and straight throughout their entire length.

The shovel-back comprises a smooth flat plate 29, arranged to loosely fit the interior of the shovel sides and bottom. It is provided with a rectangular stiffening-frame 30 at its edges. At its top are two transverse angle-bars 31, firmly secured thereto and connected to a sliding supporting-plate 32. This sliding supporting-plate is mounted in guide-plates 33, which are firmly fixed to the angle-bars 17, 24, and 25, there being two spacing-bars 34 between the outer edges of the plates 33 and the angle-bars 24 and 25. At each end of the sliding supporting-plate 32 is a reinforcing-block 35, made of hard metal, for purposes hereinafter made clear, and below each end of the plate 32 is a downwardly-projecting block 36, having a loop 37 attached thereto to receive the chain 38, which is connected with the cable 16, and at the other end of the block 36 are two brace-rods 39, extending downwardly and toward the shovel-back, to which they are firmly fixed. By this arrangement it is obvious that the shovel-back is firmly supported within the shovel and yet may be moved from one end of the shovel to the other.

I have provided for securing the shovel-back when in position at either limit of its movement and also for automatically releasing it, so that it may be moved to its opposite limit, as follows: Two blocks 40ª are fixed to the guide-plates 33 to engage the angle-bars 31 when the shovel-back is at either limit of its movement, and thereby prevent it from moving out of the shovel. Pivoted between the angle-bars 24 and 25 is a trip-lever 40 to extend outwardly from the center of the shovel over the cross-piece 18. Pivoted beneath the trip-lever 40 is a locking-bar 41, which is also pivoted between the angle-bars 24 and 25 and which extends downwardly and toward the center of the shovel and has secured to its lower end a reinforced block 42 of hard metal. An arm 43 is pivoted to the bar 41 to extend upwardly, and it is provided with a slot 44 to receive a pin 45, which is fixed to the trip-lever 40, thus allowing a slight movement between the trip-lever and the locking-bar 41. The shape and proportion of each of these parts are such that the locking-bar may rest upon the top of the plate 32 while the arm 40 is resting on top of the angle-bar 18, and which may also drop by gravity to a point where its reinforcing-block 42 will engage the reinforcing-block 35 of the plate 32 without any movement on the part of the lever 40. However, when the free end of the said lever 40 is elevated to a sufficient degree it will raise the locking-bar above the plate 32, so that the plate may freely slide in its guides. Furthermore, the shape and proportion of the plate 32 is such that when one end of it is in engagement with one of the locking-bars 41 the shovel-back will be at one limit of its movement and when the other end of the plate 32 is in engagement with the other locking-bar the shovel-back will be at its opposite limit of movement, it being understood that there are two trip-levers and locking-bars, as shown in the drawings.

I have provided means for automatically stopping the movement of the shovel when it has reached a dumping-point and for lifting the locking-bar, so that the shovel-back may continue to move as follows: Fixed to the angle-bars 11 at the point where the dumping is to take place are two stops 46 in the path of the cross-pieces 17, which are provided to positively stop the advance of the shovel when it reaches said stops. Adjacent to the stops 46 is a fixed cross-piece 47 with its ends secured to the angle-bars 11. Slidingly supported on the angle-bars 11 is another cross-piece 48, and two parallel angle-bars 49 and 50 are fixed to the sliding cross-piece 48 and adjustably connected to the fixed cross-piece 47 by means of the bolt 51, passed through openings in the bars 49 and 50 and inserted in the fixed cross-piece 47. In this way the cross-piece 48 and the bars 49 and 50 may be adjusted relative to the cross-piece 47. Rotatably mounted between the ends of the bars 49 and 50 is a trip-roller 52, arranged to be engaged by the trip-lever 40 just prior to the time the shovel engages the stops 46, so that before the shovel strikes the fixed stops the shovel-back will be free to move from one end of the shovel to the other and discharge the load. As soon as the shovel-back reaches its limit of movement after having cleaned the shovel and discharged the load the locking-bar 41, not previously engaged, will drop behind the end of the plate 32, and thus lock the shovel-back in position at the end of the shovel opposite from the end it previously occupied.

In practical use and assuming the shovel to be at one end of its movement on the ditching-machine frame then the cable is moved in a direction to draw the shovel through the ditch, where it will cut out the material through which it is drawn, and thereby become filled. As soon as the shovel reaches the discharge-point the tripping-rollers will engage the trip-lever and raise the locking-bar above the plate which supports the sliding back. Then a further pull upon the cable will cause the back to move to the outer end of the shovel, and thus discharge the load and clean the interior of the shovel. My improvement is of especial value in places where the shovel cuts through wet clay or earth that tends to adhere to the shovel, because the movement of the back will clean the interior of the shovel no matter how tenaciously the clay or earth should cling to it. Then when the shovel-back has been moved relative to the shovel to a sufficient degree the locking-bar will drop behind the end of the shovel-back-supporting plate. Then when the movement of the cable is reversed the shovel-back-supporting plate will strike against and be held by the locking-bar, so that the back will always be at the rear end of the shovel when the shovel is moving in either direction.

I provide hardened contact-blocks for the ends of the shovel-supporting plates and the locking-bars to prevent excessive wear at these points.

Having thus described my invention, what I claim, and desire to secure by Letters Patent of the United States therefor, is—

1. The combination of an open-ended ditching-shovel and a shovel-back slidingly supported within the shovel and capable of movement longitudinally of the shovel.

2. The combination of an open-ended ditching-shovel, earth-cutting edges at both ends of the shovel and a shovel-back slidingly supported within the shovel and capable of movement from one end of the shovel to the other.

3. A ditching-shovel, comprising a frame, shovel sides and bottom connected with the frame, earth-cutting blades at the ends of the shovel, also connected with said frame, a plate slidingly supported on the frame and a shovel-back fixed to said plate.

4. A ditching-shovel, comprising a frame, shovel sides and bottom connected with the frame, earth-cutting blades at the ends of the shovel, also connected with said frame, a plate slidingly supported on the frame, a shovel-back fixed to said plate and means carried by the frame for locking the sliding plate in position with the shovel-back adjacent to either end of the shovel.

5. In a ditching-shovel, the combination of a frame, shovel sides and bottom fixed to said frame, a sliding plate mounted in the frame, a shovel-back fixed to said plate and two locking-bars pivoted in the frame to engage the sliding plate and thereby hold the shovel-back in position at either end of the shovel.

6. In a ditching-machine, the combination of a track, an open-ended shovel slidingly mounted in the track, a shovel-back slidingly mounted in the shovel, a locking-bar for holding the shovel-back near one end of the shovel, a cable attached to the shovel-back to advance the shovel-back and shovel, means for limiting the movement of the shovel and means for releasing the locking-bar to permit the shovel-back to move after the shovel has been stopped.

7. In a ditching-machine, the combination of a track, an open-ended shovel slidingly mounted in the track, a shovel-back slidingly mounted in the shovel, a locking-bar for holding the shovel-back near one end of the shovel, a cable attached to the shovel-back to advance the shovel-back and shovel, means for limiting the movement of the shovel, means for automatically releasing the locking-bar to permit the shovel-back to move after the shovel has been stopped, and stops for preventing the shovel-back from moving out of the shovel.

8. In a ditching-machine, the combination of a supporting-track, an open-ended shovel slidingly mounted in the track, a shovel-back slidingly mounted in the shovel, two locking bars connected with the shovel for holding the shovel-back in position at either end of its movement, a trip-lever connected with each locking-bar, a rope or cable connected with the shovel-back for advancing the shovel-back and shovel, a stop for limiting the movement of the shovel and means for engaging the trip-levers to release the locking-bars to permit the shovel-back to move after the shovel has stopped.

9. In a ditching-machine, the combination of a supporting-track, an open-ended shovel slidingly mounted in the track, a shovel-back slidingly mounted in the shovel, two locking-bars connected with the shovel for holding the shovel-back in position at either end of its movement, a trip-lever connected with each locking-bar, a rope or cable connected with the shovel-back for advancing the shovel-back and shovel, a stop for limiting the movement of the shovel and adjustable means for engaging the trip-levers to release the locking-bars to permit the shovel-back to move after the shovel has stopped.

10. In a ditching-machine, a track, a roller adjustably supported at one end of the track, a shovel-supporting frame, wheels thereon to traverse said track, a plate slidingly mounted in the frame, a shovel-back connected with said plate, a locking-bar pivoted to the frame to engage one end of said plate, a slotted arm on the locking-bar, a trip-lever fulcrumed to the frame and provided with a bolt to enter the slot in said arm, said trip-lever designed to engage the adjustable roller, a stop adjacent to the adjustable roller to engage the shovel and a chain or cable attached to the shovel-back.

WILLIAM F. COOK.

Witnesses:
 SIDNEY F. CHRISTY,
 J. RALPH ORWIG.